United States Patent
Zhai et al.

(10) Patent No.: US 10,556,286 B2
(45) Date of Patent: Feb. 11, 2020

(54) RESISTANCE BRAZING FOR A SHAFT BALANCING SYSTEM

(71) Applicant: ArvinMeritor Technology, LLC, Troy, MI (US)

(72) Inventors: Yang Zhai, Rochester Hills, MI (US); Richard A. Dlouhy, Pinehurst, NC (US)

(73) Assignee: ArvinMeritor Technology, LLC, Troy, MI (US)

(*) Notice: Subject to any disclaimer, the term of this patent is extended or adjusted under 35 U.S.C. 154(b) by 354 days.

(21) Appl. No.: 15/429,938

(22) Filed: Feb. 10, 2017

(65) Prior Publication Data

US 2018/0229321 A1 Aug. 16, 2018

(51) Int. Cl.

| | |
|---|---|
| *B23K 1/19* | (2006.01) |
| *B23K 1/00* | (2006.01) |
| *B23K 1/20* | (2006.01) |
| *G01M 1/32* | (2006.01) |
| *G01M 1/24* | (2006.01) |
| *B23K 103/04* | (2006.01) |
| *B23K 103/06* | (2006.01) |
| *B23K 103/18* | (2006.01) |
| *B23K 101/06* | (2006.01) |
| *B23K 101/00* | (2006.01) |

(52) U.S. Cl.
CPC .............. *B23K 1/19* (2013.01); *B23K 1/0004* (2013.01); *B23K 1/203* (2013.01); *G01M 1/24* (2013.01); *G01M 1/32* (2013.01); *B23K 2101/005* (2018.08); *B23K 2101/06* (2018.08); *B23K 2103/04* (2018.08); *B23K 2103/06* (2018.08); *B23K 2103/18* (2018.08)

(58) Field of Classification Search
CPC ........ B23K 1/0004; B23K 1/19; B23K 1/203; B23K 2101/005; B23K 2101/06; B23K 2103/04; B23K 2103/06; B23K 2103/18; G01M 1/24; G01M 1/32
USPC ...................................... 219/85.22
See application file for complete search history.

(56) References Cited

U.S. PATENT DOCUMENTS

| | | | |
|---|---|---|---|
| 7,441,456 B1 * | 10/2008 | Corbin .................... | G01M 1/16 73/462 |
| 2003/0024309 A1 * | 2/2003 | Loetzner ................ | G01M 1/24 73/462 |
| 2016/0151854 A1 | 6/2016 | Zhai | |
| 2016/0318062 A1 | 11/2016 | Zhai et al. | |

FOREIGN PATENT DOCUMENTS

| | | | |
|---|---|---|---|
| DE | 102015108146 | * | 12/2016 |
| WO | WO2006027012 | * | 3/2006 |

* cited by examiner

*Primary Examiner* — Dana Ross
*Assistant Examiner* — Joseph W Iskra
(74) *Attorney, Agent, or Firm* — Brooks Kushman P.C.

(57) ABSTRACT

A method and a system of balancing a shaft for an axle assembly. The method may include using an electrical resistance welder to weld a balance weight to a shaft proximate an imbalance location using an insert or brazing material. The insert material may have a lower liquidus temperature than a liquidus temperatures of the shaft and balancing weight.

20 Claims, 3 Drawing Sheets

RESISTANCE BRAZING FOR A SHAFT BALANCING SYSTEM

TECHNICAL FIELD

The present disclosure relates to a method of balancing a shaft and a shaft balancing system.

BACKGROUND

A shaft balancing system is disclosed in U.S. Patent Pub. No. 2016/0318062. A method of joining dissimilar materials is disclosed in U.S. Patent Pub. No. 2016/0151854.

SUMMARY

In at least one approach, a method of balancing a shaft for an axle assembly is provided. The method may include locating an imbalance location of the shaft. An insert material and a balance weight may be applied adjacent the imbalance location. A first electrode may be positioned in contact with the balance weight, and a second electrode may be positioned in contact with a surface of the shaft. The first and second electrodes may be activated to heat the shaft, the insert material, and the balance weight. The first and second electrodes may be deactivated to permit the insert material to cool and secure the balance weight to the shaft.

In at least one approach, a method of balancing a shaft for an axle assembly is provided. The method may include locating an imbalance location of the shaft. A flux, an insert material, and a balance weight may be applied adjacent the imbalance location. A first electrode may be positioned in contact with the balance weight. A second electrode may be positioned in contact with a surface of the shaft. The first and second electrodes may be activated to heat the shaft, the insert material, and the balance weight. The first and second electrodes may be activated to heat the insert material to a liquidus temperature of the insert material, and may be deactivated prior to heating the shaft to a liquidus temperature of the shaft and prior to heating the balance weight to a liquidus temperature of the balance weight.

In at least one embodiment, a shaft balancing system is provided. The shaft balancing system may include a dynamic balancer that may rotate a shaft about an axis and determine an imbalance location of the shaft. The shaft balancing system may further include an electric resistance welder having a first electrode and a second electrode that cooperate to weld a balance weight onto the shaft with an insert material disposed proximate the imbalance location.

DETAILED DESCRIPTION

Figure 1:
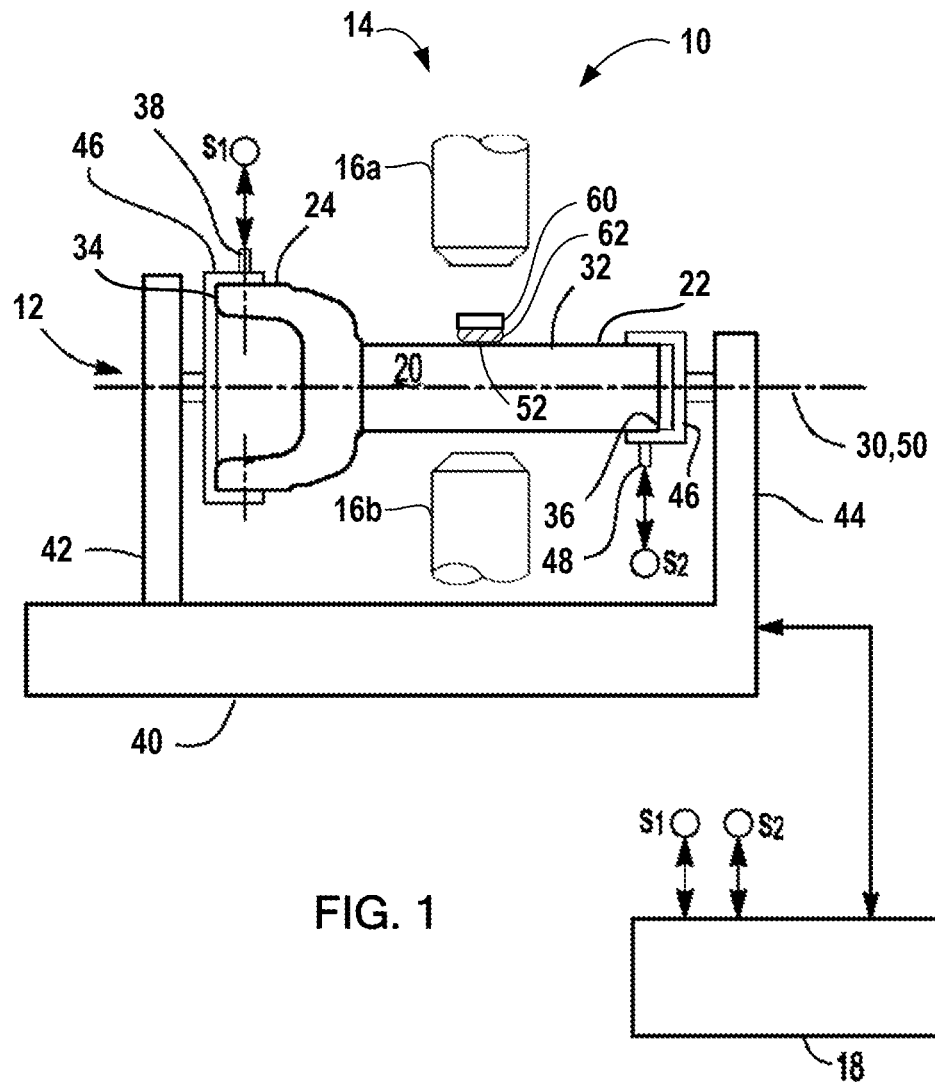
FIG. 1 is an illustration of an example of a shaft balancing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One or more axle assemblies may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments. Axle assembly components may be made of a high strength cast iron due to the ability of high strength cast irons to endure the high stresses and cyclic loading that may be experienced by axle components. The use of a high strength cast iron may enable the creation of the complex shapes of axle components and may reduce machining processes employed to achieve the desired shape. Axle components that may be subject to high stresses and cyclic loading may include axle housings, drum brake assemblies, differential carrier assemblies, brake calipers, axle shafts, input shafts, output shafts, etc.

High strength cast irons may contain carbon and silicon, the concentrations of which may impact the strength and ductility of the high strength cast iron. The carbon and silicon content of the high strength cast iron may impact the ability to weld accessories or other components to the axle components to form an axle assembly.

Some components that are associated with an axle assembly may be operatively connected and may rotate at different speeds to transmit driving torque from a propulsion source to a wheel assembly. The complexities of the axle assembly components may require precise balancing of components, such as drive shafts, prop shafts, axle shafts, wheel assemblies, brake drums, wheel hubs, etc. A dynamic imbalance of at least one component of an axle assembly may result in driveline disturbances or vibrations that may increase part wear or decrease service life.

Axle assembly components may be dynamically balanced in a single plane or in multiple planes. Dynamic balancing may involve rotating an axle assembly component at a predetermined speed and measuring an amount of imbalance. The amount of imbalance may be compared to an imbalance tolerance. The imbalance tolerance may be established separately for each axle component or may be combined into a single axle assembly level tolerance. The imbalance of the axle assembly component may be corrected to be within the imbalance tolerance by the mechanical addition of discrete weights or the removal of material and weight from the axle assembly component. Discrete weights may be fixedly disposed on an external surface of the axle assembly component by resistance welding. Discrete weights may be, for example, steel balance weights. The steel balance weights may be joined to the axle component to form an axle assembly by a joining process.

Welding steel components to cast iron components may present challenges that may affect the strength of the base cast iron material. The heat produced from the welding process may further dissolve or diffuse the microstructure of the cast iron component. The dissolving or diffusing may result in the formation of carbides, martensite, cementite, or bainite proximate the weld zone. The formations that include cementite may be referred to as "white cast iron." These formations may reduce the strength of a cast iron part. Therefore, welding of cast iron is disfavored due to the potential loss of strength.

A possible solution to obviate the challenges presented in welding cast iron parts is to provide an insert material disposed between the steel component and the cast iron component and perform a low temperature metallurgical joining process. At least a portion of the insert material may melt at a lower temperature than the components made of dissimilar materials such as the cast iron component and the steel component. As such, the melting temperature of the insert material may be a temperature that is less than the melting temperature or solidus temperature of the steel component or the cast iron component.

The low temperature metallurgical joining process may enable the joining of components made of dissimilar materials at a temperature less than is associated with traditional welding processes. The low temperature metallurgical joining process may join the steel component to the cast iron component while reducing negative effects on the material properties of the steel component or the cast iron component.

Referring to FIG. 1, a shaft balancing system 10 is shown. The shaft balancing system 10 may include a dynamic balancer 12, an electric resistance welder 14 having a first electrode 16a and a second electrode 16b, and a control system 18. The first electrode 16a may be disposed opposite the second electrode 16b, and may be oriented to face the second electrode 16b. The first electrode 16a may be sufficiently spaced from the second electrode 16b such that the shaft balancing system 10 may be receive a shaft 20 between the first electrode 16a and the second electrode 16b. The first electrode 16a, the second electrode 16b, or both the first and second electrodes 16a, 16b may receive current from a current source (not shown).

The dynamic balancer 12 may be a single plane or multi-plane dynamic balancer that may locate at least one imbalance location on an axle component, such as a shaft 20 for an axle assembly.

The shaft 20 may be of any suitable type. In the context of an axle assembly, the shaft 20 may be an input shaft or an output shaft. An input shaft may receive torque from a torque source, such as an engine or another axle assembly. For instance, the input shaft may be operatively connected to a drive shaft or a prop shaft that may provide torque to the axle assembly. An output shaft may provide torque to another drivetrain component or axle assembly. For instance, an output shaft may be operatively connected to a prop shaft that may provide torque to another axle assembly that may be connected in series with the axle assembly. The shaft 20 may be part of a slip yoke and may include a shaft portion 22 and a yoke portion 24.

The shaft portion 22 may extend along and may be configured to rotate about an axis 26. The shaft portion 22 may be substantially cylindrical in one or more embodiments.

The yoke portion 24 may be fixedly coupled to the shaft portion 22 in any suitable manner, such as with an interference fit, adhesive, mechanical fastener, weld, or combinations thereof. It is also contemplated that the yoke portion 24 may be integrally formed with the shaft portion 22 and thus the shaft portion 22 and the yoke portion 24 may be a unitary one-piece component.

The shaft 20 may extend along an axis 30 and may have an exterior surface 32. The exterior surface 32 may be an exterior circumference of the shaft 20. In at least one approach, the exterior surface may face away from the axis 30 or may face toward the axis 30, such as in a hollow shaft or shaft having a hole. The exterior surface may be called an interior surface when it defines a hole in the shaft 20. The shaft 20 may have a first end 34 and a second end 36 that may be disposed opposite the first end 34. In at least one approach, the shaft 20 may be an input shaft of an axle assembly. The shaft 20 may be, for example, a cast iron shaft and may have a liquidus temperature between approximately 1000° C. and 1200° C.

The dynamic balancer 12 may have a base 40, a first support 42, a second support 44, a drive mechanism 46, and an imbalance sensor 48.

The base 40 may support components of the dynamic balancer 12. For example, the base 40 may support the first support 42 and the second support 44.

The first support 42 may extend from the base 40 and may rotatably support the first end 34 of the shaft 20. The first support 42 may define a first correction plane.

The second support 44 may extend from the base 40 and may rotatably support the second end 36 of the shaft 20. The second support 44 may define a second correction plane. The first support 42 may be spaced apart from the second support 44.

The drive mechanism 46 may rotate the shaft 20 about an axis of rotation 50. For example, the drive mechanism 46 may be provided with the first support 42 and/or the second support 44 in one or more approaches. The axis of rotation 50 may be coincident with the axis 30 of the shaft 20 when the shaft 20 is received in the dynamic balancer 12.

An imbalance sensor 48 may be disposed proximate the first support 42, the second support 44, or both the first support 42 and the second support 44. The imbalance sensor 48 may detect or provide a signal or data indicative of imbalance of the shaft 20. The imbalance sensor 48 may be of any suitable type. For example, the imbalance sensor 48 may be configured as an accelerometer, a vibration sensor, or the like and may detect acceleration, vibration, noise or harmonics in a manner known by those skilled in the art. The signal or data from the imbalance sensor 48 may be communicated to the control system 18 and may be used by the control system 18 to determine an imbalance location 52 of the shaft 20. An imbalance location 52 may be a location where there may be improper mass distribution or insufficient mass to provide even distribution of the center of mass of the shaft 20 with respect to the axis of rotation 50. As such, an imbalance location 52 may exist when the center of mass of the shaft or part to be balanced is not aligned with the axis of rotation 50 or geometric axis of the shaft 20. The imbalance location 52 may be located on an exterior or interior surface of the shaft 20 and may be located where a balance weight or mass may be added to the shaft to correct the dynamic balance of the shaft 20.

The control system 18 may include one or more electronic controllers or control modules and may monitor and control various components of the shaft balancing system 10. For example, the control system 18 may be electrically connected to or may communicate with components of the shaft balancing system 10, such as the electric resistance welder 14, the drive mechanism 46, and the imbalance sensors 38. Communication between the control system 18 and the imbalance sensors 38 may be represented by connection nodes S1 and S2 in FIG. 1.

The electric resistance welder 14 may be used to secure a balance weight 60 to the shaft 20 with an insert material 62. The balance weight 60 may be made of any suitable material. For instance, the balance weight 60 may be made of a metal alloy such as a steel, like a low carbon steel (also referred to as a mild steel). The balance weight 60 may have a liquidus temperature between approximately 1300° C. and 1400° C. The balance weight 60 may include a curved lower surface. The curved lower surface may have a curvature corresponding to a radius of curvature of the exterior surface 32 of the shaft 20. The balance weight 60 may be sized and positioned to counterbalance an imbalance of the shaft 20.

The insert material 62 may be made of any suitable material. For example, the insert material 62 may be a brazing material or a brazing alloy that may include copper, zinc, nickel, and/or silver. For example, the brazing material may include, by weight, at least 40% copper, at least 30% zinc, and at least 10% nickel, with the remainder including one or more other elements. Other compositions are possible. The insert material 62 may also be formed of one or more base metals, or eutectic mixtures or alloys thereof, such as aluminum, copper, gold, platinum, silver, tin, phosphorous, palladium, nickel, manganese, zinc, cadmium, chromium, boron, silicon, iron, carbon, sulphur, titanium, zirconium, tungsten, cobalt, molybdenum, niobium, selenium, lead, palladium, bismuth, beryllium, lithium and indium. Other metals, metal alloys, or minerals may also be used.

The selected insert material 62 may have a liquidus temperature sufficiently less than the liquidus temperatures of the shaft 20 and the balance weight 60. For example, the insert material 62 may have a liquidus temperature between approximately 800° C. and 1000° C. In this way, during the brazing process, the insert material 62 may melt at temperature that does not adversely affect the structural integrity of the shaft 20 or the balance weight 60.

Figure 2:
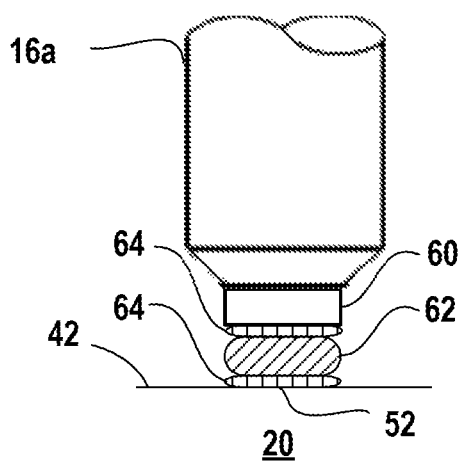
FIG. 2 is a side view of a balance weight and insert material disposed on a shaft.

With reference to FIG. 2, a flux 64 may be provided between the balance weight 60 and shaft 20. The flux 64 may be, for example, borax or other suitable mineral or compound. The flux 64 may be chemically compatible with both the material of the shaft 20 and the insert material 62, and may be selected so as to inhibit oxides from forming while the shaft 20 is heated during the brazing process.

The flux 64 may be applied to the exterior surface 32 of the shaft 20, the insert material 62, the balance weight 60, or combinations thereof. The flux 64 may be applied in any number of forms including flux paste, liquid, powder, or a brazing paste that combines the flux 64 with insert material 62. The flux 64 can also be applied using a brazing rod having a flux coating or a flux core.

Figure 3:
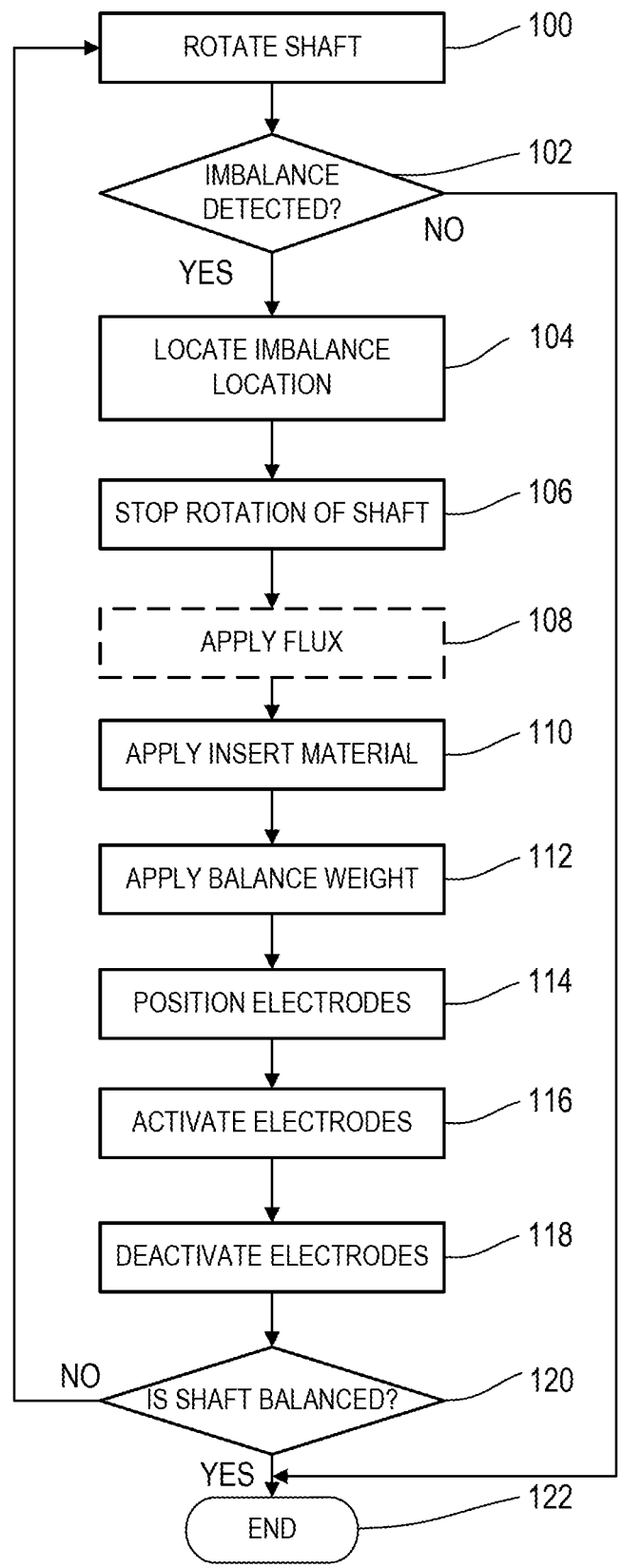
FIG. 3 is a flowchart of a method of balancing a shaft for an axle assembly.

Referring to FIG. 3, a flowchart of an exemplary method of balancing a shaft 20 for an axle assembly is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

The method may be executed by the control system 18 and may be implemented as a closed loop control system. As such, the flowchart in FIG. 3 may be representative of a single iteration and may be repeated to verify the balance or rebalance the shaft 20. The flowchart begins with the shaft 20 rotatably mounted to the dynamic balancer 12. The shaft being made, for example, of cast iron.

At block 100, the shaft 20 may be rotated about the axis of rotation 50 by the dynamic balancer 12. The shaft 20 may be rotated up to a predetermined rotational speed by the drive mechanism 46.

At block 102, upon achieving the predetermined rotational speed, the method may detect an imbalance in the shaft 20. For example, the control system 18 may receive a signal from the imbalance sensor 48 while the shaft 20 is rotating at the predetermined rotational speed. The control system 18 may use the signal from the imbalance sensor 48 to detect an imbalance. An imbalance may be detected when the center of mass of the shaft 20 is not located along the axis 30 of the shaft 20 and/or the axis of rotation 50. If an imbalance is not detected, then the method or iteration of the method may end at block 122. If an imbalance location is detected, then the method may continue at block 104.

At block 104, the method may locate the imbalance location 52 of the shaft 20. For example, the control system 18 may use the signal from the imbalance sensor 48 to determine the location of the imbalance location 52. For instance, the control system 18 may determine a central principal axis that may proximately intersect the axis of rotation 50 and the imbalance location 52. The control system 18 may also determine a correction mass amount based on the position of the imbalance location 52 and a relative positioning of the central principal axis with respect to the axis of rotation 50.

At block 106, the dynamic balancer 12 may stop rotation of the shaft 20 about the axis of rotation 50 and hold the shaft 20 in a stationary position after locating the imbalance location 52. The shaft 20 may be stopped such that the imbalance location 52 may be located directly above the axis of rotation 50 to facilitate resistance brazing of a balance weight at the imbalance location 52.

At block 108, flux 64 may optionally be applied. For example, the flux 64 may be applied to the exterior surface 32 of the shaft 20. Alternatively, or in addition, the flux 64 may be applied to a balance weight 60 or insert material 62. This step may be omitted in one or more embodiments.

Figure 4:
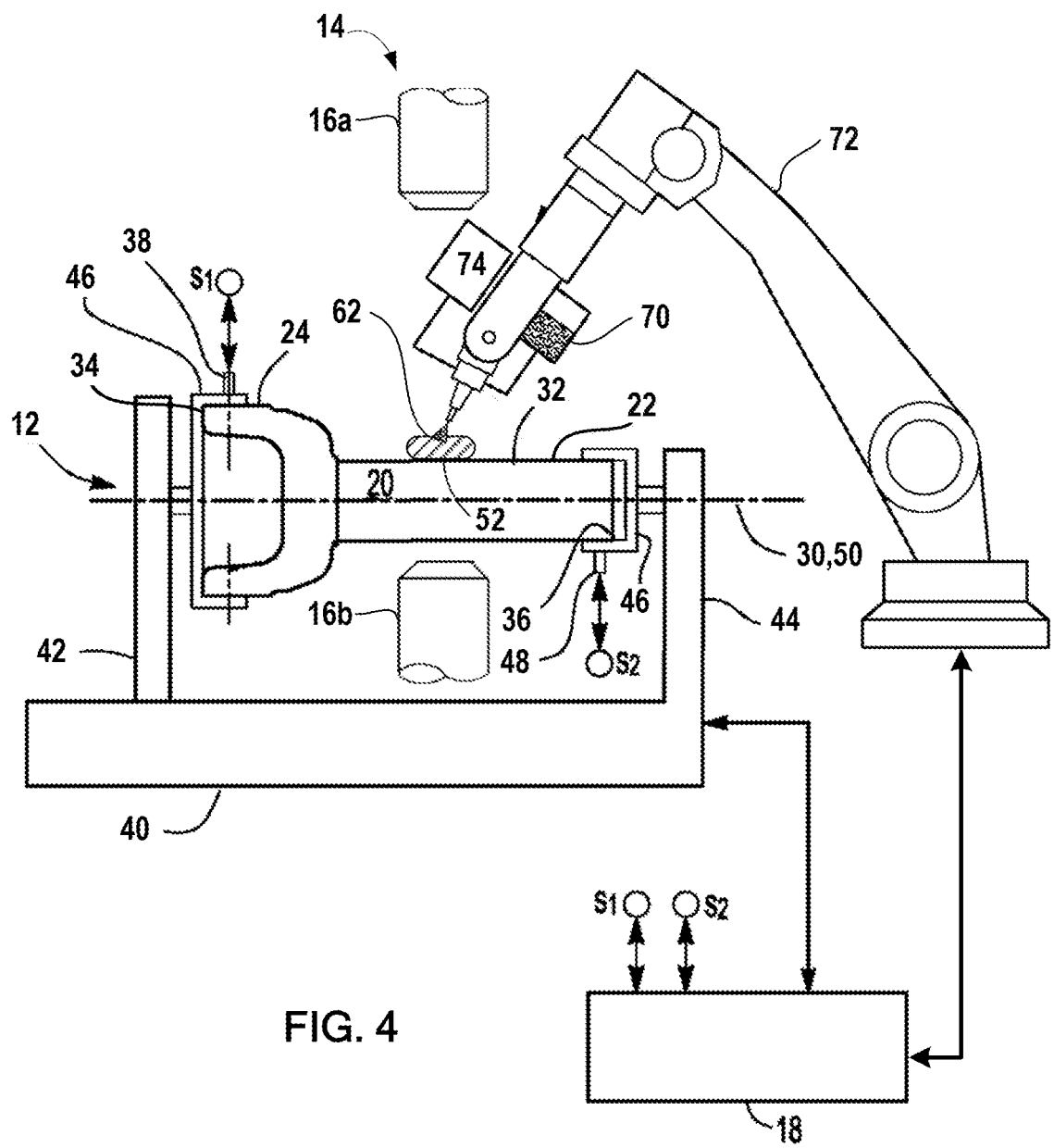
FIG. 4 is an illustration of another configuration of a shaft balancing system.

At block 110, the insert material 62 is applied. In one approach, the insert material 62 is applied to the exterior surface 32 of the shaft 20 at the imbalance location 52. For example, the insert material 62 may be manually placed on the shaft 20. In another example, referring momentarily to FIG. 4, the insert material 62 may be deposited as a powder insert material composition 70 using a solid-state spraying process in which the particles of the powder insert material composition 70 may be propelled as solid particles by powder metal deposition device 72. The solid-state spraying process may be a cold gas dynamic spraying process such as a high pressure gas dynamic spraying process, low pressure gas dynamic spraying process, or pulsed cold gas dynamic spraying process. A high pressure gas dynamic spraying process may use a compressed carrier gas 74 at a pressure of approximately 340 psi to 600 psi (approximately 2,275 kPa to approximately 4136 kPa). A low pressure gas dynamic spraying process may use a compressed carrier gas 74 at a pressure of approximately 70 psi to 145 psi. A pulsed cold gas dynamic spraying process may provide pulsed delivery of the compressed carrier gas 74 such that gas shockwaves may aid in the propulsion of the powder insert material composition 70 toward the shaft 20.

A cold gas dynamic spraying process may be performed at a temperature less than a melting point of the powder insert material composition 70 and at a temperature that may be less than the melting point of the exterior surface 32 of the shaft 20 upon which the powder insert material composition 70 may be deposited. As such, the insert material may be deposited on the shaft 20 without melting the insert material.

In another approach, the insert material 62 may be applied to a balance weight 60. Application of the insert material 62 to the balance weight 60 may be performed prior to or during the dynamic balancing of the shaft 20. For example, the insert material 62 may be pre-applied to a balance weight 60 and may be applied at a different location than where balancing of the shaft 20 occurs. The insert material 62 may be affixed to the balance weight through any suitable application, including coating, spraying (e.g., cold/hot spray), screening, cladding, brushing, etc.

At block 112, the balance weight 60 may be applied to the shaft 20 at the imbalance location 52. For example, the balance weight 60 may be manually placed on the shaft 20. Furthermore, because rotation of the shaft 20 may be stopped such that the imbalance location is located directly above the axis 30, the balance weight 60 gravity may help hold the balance weight on the shaft 20.

At block 114, the electrodes 16a, 16b of the electric resistance welder 14 are moved and positioned. For example, electrode 16a may be moved into contact with the balance weight 60, and electrode 16b may be moved into contact with a surface of the shaft 20 opposite the imbalance location 52. When in position, the electrodes 16a, 16b may apply a squeeze pressure to the balance weight 60, the insert material 62, and the shaft 20 at the imbalance location 52.

At block 116, the electrodes 16a, 16b are activated. Activation of the electrodes 16a, 16b may include providing a weld current through the first electrode 16a, the second electrode 16b, or through the first and second electrodes 16a, 16b. The electrodes may be activated, for example, for between one and ten seconds. During this time, current flows through the electrode(s), and the insert material 62 is brought above its liquidus temperature. However, neither the balance weight 60 nor the shaft 20 is brought to a respective liquidus temperature. In this way, the insert material 62 is brought to a molten or liquid phase without melting the shaft 20 or the balance weight or negatively affecting the structural integrity of a cast iron component (e.g., the shaft is not melted).

At block 118, the electrodes 16a, 16b are deactivated. The electrodes 16a, 16b may be deactivated by terminating the flow of current to the first electrode 16a, the second electrode 16b, or through the first and second electrodes 16a, 16b. Current through the insert material 62, balance weight 60, and shaft 20 is thereby discontinued. The electrodes 16a, 16b may maintain the squeeze pressure at the imbalance location 52 for a predetermined hold time after the electrodes 16a, 16b are deactivated. The insert material 62 may then cool and solidify, thereby fixedly securing the balance weight 60 to the shaft 20.

At block 120, the method may determine if the shaft 20 is balanced. This step may be similar or the same as block 102. The shaft 20 may be balanced if an amount of imbalance of the shaft 20 is within an imbalance tolerance. If the shaft 20 is balanced, then the method or iteration of the method may end at block 122.

If the shaft 20 is not balanced, then the method may be repeated or return to block 100. In this way, the method may further include locating a second imbalance location of the shaft after securing the first balance weight to the shaft. The method may further include applying a second insert material and a second balance weight adjacent the second imbalance location. A first electrode may be positioned in contact with the second balance weight, and the second electrode may be positioned in contact with the surface of the shaft. The method may further include activating the first and second electrodes to heat the shaft and the second balance weight, without melting the shaft. The first electrode 16a, the second electrode 16b, or the first and second electrodes 16a, 16b may then be deactivated to permit the second insert material to cool and secure the second balance weight to the shaft.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of balancing a shaft, the method comprising:
    locating an imbalance location of the shaft, the shaft being made of cast iron;
    applying an insert material, a flux, and a balance weight adjacent the imbalance location;
    positioning a first electrode in contact with the balance weight and a second electrode in contact with a surface of the shaft;
    providing current through the first and second electrodes to heat the shaft and the insert material, without melting the shaft; and
    deactivating the first and second electrodes to permit the insert material to cool and secure the balance weight to the shaft.

2. The method of claim 1, wherein the insert material has a liquidus temperature that is less than a liquidus temperature of the shaft and is less than a liquidus temperature of the balance weight.

3. The method of claim 2, further comprising deactivating the first and second electrodes after heating the insert material to the liquidus temperature of the insert material and prior to heating the shaft to the liquidus temperature of the shaft and prior to heating the balance weight to the liquidus temperature of the balance weight.

4. The method of claim 1, wherein applying the insert material comprises applying the insert material on the balance weight prior to positioning the balance weight adjacent the imbalance location.

5. The method of claim 1, wherein applying the insert material comprises applying the insert material on the shaft adjacent the imbalance location prior to positioning the balance weight adjacent the imbalance location.

6. The method of claim 5, wherein the insert material is applied using a solid-state spraying process.

7. A method of balancing a shaft, the method comprising:
    locating a first imbalance location of the shaft, the shaft being made of cast iron;
    applying a first insert material and a first balance weight adjacent the first imbalance location;

positioning a first electrode in contact with the first balance weight and a second electrode in contact with a surface of the shaft;

providing current through the first and second electrodes to heat the shaft and the first insert material without melting the shaft;

deactivating the first and second electrodes to permit the first insert material to cool and secure the first balance weight to the shaft;

locating a second imbalance location of the shaft after securing the first balance weight to the shaft;

applying a second insert material and a second balance weight adjacent the second imbalance location;

positioning the first electrode in contact with the second balance weight and the second electrode in contact with the surface of the shaft;

activating the first and second electrodes to heat the shaft, the second insert material, and the second balance weight; and deactivating the first and second electrodes to permit the second insert material to cool and secure the second balance weight to the shaft.

8. The method of claim 1, wherein the flux is applied to the shaft adjacent the imbalance location prior to applying the insert material and the balance weight adjacent the imbalance location.

9. The method of claim 1, wherein the flux is applied to the insert material prior to applying the insert material and the balance weight adjacent the imbalance location.

10. The method of claim 1, further comprising:
rotating the shaft about an axis to locate the imbalance location; and
in response to locating the imbalance location, stopping rotation of the shaft such that the imbalance location is located directly above the axis.

11. The method of claim 7 wherein activating the first and second electrodes to heat the shaft, the second insert material, and the second balance weight does not melt the shaft.

12. The method of claim 1, wherein the shaft is a first material, the insert material is a second material different than the first material, and the balance weight is a third material different than the first material and the second material.

13. The method of claim 12, wherein the first material is cast iron, the second material is a composition formed of copper, nickel, and silver, and the third material is steel.

14. A method of balancing a shaft for an axle assembly, the method comprising:
locating an imbalance location of the shaft, the shaft being made of cast iron;
applying a flux, an insert material, and a balance weight adjacent to the imbalance location;
positioning a first electrode in contact with the balance weight and a second electrode in contact with a surface of the shaft opposite the balance weight;
providing current through the first and second electrodes to heat the insert material to a liquidus temperature of the insert material; and
deactivating the flow of current through the first and second electrodes prior to heating the shaft to a liquidus temperature of the shaft and prior to heating the balance weight to a liquidus temperature of the balance weight.

15. The method of claim 14, wherein the flux is applied to the shaft adjacent the imbalance location prior to applying the insert material and the balance weight adjacent the imbalance location.

16. The method of claim 14, wherein the flux is applied to the insert material prior to applying the insert material and the balance weight adjacent the imbalance location.

17. The method of claim 14, wherein the shaft is cast iron, the insert material is a composition formed of copper, nickel, and silver, and the balance weight is steel.

18. The method of claim 14 wherein
a dynamic balancer rotates the shaft about an axis to determine the imbalance location of the shaft.

19. The method of claim 18, wherein the first electrode is located directly above the axis and the dynamic balancer holds the shaft in a stationary position when the first and second electrodes are activated.

20. The method of claim 7 wherein the first electrode is located above an axis of the shaft when the first and second electrodes are activated to heat the first balance weight and the second balance weight.

* * * * *